(12) United States Patent
Kulkarni et al.

(10) Patent No.: US 10,684,947 B2
(45) Date of Patent: Jun. 16, 2020

(54) INCREASING HIGH PERFORMANCE DATA STORAGE UTILIZATION BY REDUCING WRITE OPERATIONS

(71) Applicant: International Business Machines Corporation, Armonk, NY (US)

(72) Inventors: Shweta Kulkarni, Nasik (IN); Vikrant Malushte, Pune (IN); Rahul M. Fiske, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/959,017

(22) Filed: Apr. 20, 2018

(65) Prior Publication Data

US 2019/0324899 A1    Oct. 24, 2019

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0604* (2013.01); *G06F 3/0647* (2013.01); *G06F 3/0653* (2013.01); *G06F 3/0658* (2013.01); *G06F 3/0679* (2013.01); *G06F 3/0685* (2013.01); *G06F 12/0253* (2013.01); *G06F 12/0292* (2013.01); *G06F 2212/2022* (2013.01); *G06F 2212/7201* (2013.01); *G06F 2212/7205* (2013.01)

(58) Field of Classification Search
CPC ............. G06F 12/0246; G06F 12/0253; G06F 12/0292; G06F 2212/2022; G06F 2212/7201; G06F 2212/7205; G06F 3/0604; G06F 3/061; G06F 3/0647; G06F 3/0649; G06F 3/0653; G06F 3/0658; G06F 3/0679; G06F 3/0685; G06F 3/0683; G06F 3/0682; G06F 3/068
See application file for complete search history.

(56) References Cited

U.S. PATENT DOCUMENTS

| | | | |
|---|---|---|---|
| 5,845,313 A * | 12/1998 | Estakhri | G06F 3/0613 711/103 |
| 6,772,274 B1 | 8/2004 | Estakhri | |
| 9,021,187 B2 | 4/2015 | Sela et al. | |
| 10,176,212 B1 * | 1/2019 | Prohofsky | G06F 17/30371 |

(Continued)

*Primary Examiner* — Tracy A Warren
(74) *Attorney, Agent, or Firm* — Zilka-Kotab, P.C.

(57) ABSTRACT

A computer-implemented method, according to one embodiment, includes: receiving an unmap command which corresponds to a first logical extent located in a higher storage tier, unmapping the first logical extent from a first physical storage location in the higher storage tier, marking the first physical storage location as dirty, receiving a map command which corresponds to the first logical extent, determining whether the first physical storage location is still marked as dirty, in response to determining that the first physical storage location is still marked as dirty, determining whether any data included in the first logical extent has been modified since the first logical extent was stored in the higher storage tier, and in response to determining that at least some of the data included in the first logical extent has been modified, using the modified data to update the data stored in the first physical storage location.

19 Claims, 8 Drawing Sheets

(56) References Cited

U.S. PATENT DOCUMENTS

| | | | |
|---|---|---|---|
| 2010/0293320 A1* | 11/2010 | Li | G06F 12/0246 |
| | | | 711/103 |
| 2011/0286123 A1* | 11/2011 | Montgomery | G06F 3/0608 |
| | | | 360/15 |
| 2012/0173795 A1* | 7/2012 | Schuette | G06F 12/0246 |
| | | | 711/103 |
| 2013/0275660 A1* | 10/2013 | Bennett | G06F 12/0292 |
| | | | 711/103 |
| 2014/0173177 A1* | 6/2014 | Benhase | G06F 12/0246 |
| | | | 711/103 |
| 2016/0196207 A1* | 7/2016 | Gupta | G06F 12/0246 |
| | | | 711/103 |
| 2016/0224260 A1 | 8/2016 | Bandic et al. | |
| 2017/0185298 A1 | 6/2017 | Camp et al. | |
| 2017/0192677 A1 | 7/2017 | Fisher et al. | |

* cited by examiner

INCREASING HIGH PERFORMANCE DATA STORAGE UTILIZATION BY REDUCING WRITE OPERATIONS

BACKGROUND

The present invention relates to data storage, and more specifically, this invention relates to improving performance of multi-tiered data storage systems.

The cost per unit (e.g., Gigabyte) of storage is typically higher for higher performance (e.g., faster) memory than it is for relatively lower performance memory. Thus, tiers of memory having different performance characteristics may be grouped together to form a multi-tiered data storage system.

The capacity of a higher performance data storage tier is typically smaller than the capacity of a lower data storage tier in view of their relative price. In order to maintain an efficient use of the higher performing, yet typically smaller, data storage tier, algorithms may be implemented to relocate data based on a temperature associated therewith. For example, "hotter" data may be migrated towards the higher storage tier (e.g., promoted), while "colder" data is migrated towards the slower tier (e.g., demoted). In the present context, the heat (e.g., "hotter" and "colder") of data refers to the rate (e.g., frequency) at which the data is updated. Memory blocks that are considered "hot" or "hotter" tend to have a frequent updated rate, while memory blocks that are considered "cold" or "colder" have an update rate which is at least slower than that of hot blocks. Additional factors may be incorporated into the determination of the relative heat of a given portion of data, e.g., such as read frequency. It follows that this promotion and demotion process of data actually relocates the data from one tier to another, and may even be performed without the knowledge of an application that is running.

However, some higher performance data storage tiers have a limited write endurance. In other words, some higher performance data storage tiers, such as solid state drives (SSDs), may only be able to undergo a finite number of write cycles before the memory cells therein begin to fail. Conventional products attempt to address this issue of such storage tiers by implementing wear-leveling. Wear-leveling attempts to achieve an even distribution of write cycles across all memory cells in the data storage tier, thereby achieving an about equal wear rate for the various memory cells. Yet, this process only addresses the relative wear rate of each memory cell with respect to each other and does not prolong the effective lifetime of the data storage tier as a whole.

SUMMARY

A computer-implemented method, according to one embodiment, includes: receiving an unmap command which corresponds to a first logical extent located in a higher storage tier of a multi-tiered data storage system having the higher storage tier and a lower storage tier, each storage tier comprising a plurality of hardware-based data storage devices, unmapping the first logical extent from a first physical storage location in the higher storage tier, marking the first physical storage location as dirty, storing information which links the first logical extent to the first physical storage location, receiving a map command which corresponds to the first logical extent, determining whether the first physical storage location is still marked as dirty, in response to determining that the first physical storage location is still marked as dirty, determining whether any data included in the first logical extent has been modified since the first logical extent was stored in the higher storage tier, and in response to determining that at least some of the data included in the first logical extent has been modified, using the modified data to update corresponding portions of the data stored in the first physical storage location.

A computer program product, according to another embodiment, includes a computer readable storage medium having program instructions embodied therewith. The computer readable storage medium is not a transitory signal per se. Moreover, the program instructions readable and/or executable by one or more processors to cause the one or more processors to perform a method which includes: receiving, by the one or more processors, an unmap command which corresponds to a first logical extent located in a higher storage tier of a multi-tiered data storage system having the higher storage tier and a lower storage tier, each storage tier comprising a plurality of hardware-based data storage devices; unmapping, by the one or more processors, the first logical extent from a first physical storage location in the higher storage tier; marking, by the one or more processors, the first physical storage location as dirty; storing, by the one or more processors, information which links the first logical extent to the first physical storage location; receiving, by the one or more processors, a map command which corresponds to the first logical extent; determining, by the one or more processors, whether the first physical storage location is still marked as dirty; in response to determining that the first physical storage location is still marked as dirty, determining, by the one or more processors, whether any data included in the first logical extent has been modified since the first logical extent was stored in the higher storage tier; and in response to determining that at least some of the data included in the first logical extent has been modified, using, by the one or more processors, the modified data to update corresponding portions of the data stored in the first physical storage location.

A computer-implemented method, according to yet another embodiment, includes: monitoring a current temperature corresponding to a first logical extent located in a higher storage tier of a multi-tiered data storage system having the higher storage tier and a lower storage tier, each storage tier comprising a plurality of hardware-based data storage devices, determining whether the current temperature is outside a predetermined range, sending one or more instructions to unmap the first logical extent in response to determining that the current temperature is outside the predetermined range, receiving an indication that the first logical extent has been unmapped from a first physical storage location in the higher storage tier, sending one or more instructions to mark the first physical storage location as dirty, sending one or more instructions to store information which links the first logical extent to the first physical storage location, receiving data corresponding to the first logical extent from the higher storage tier, sending the data corresponding to the first logical extent to the lower storage tier, monitoring the current temperature corresponding to the first logical extent located in the lower storage tier, determining whether the current temperature is outside the predetermined range, sending a request for the data corresponding to the first logical extent in response to determining that the current temperature is not outside the predetermined range, receiving the data corresponding to the first logical extent from the lower storage tier, sending the data corresponding to the first logical extent to the higher storage tier, determining whether the first physical storage location is still marked as dirty, in response to determining that the first physical storage location is still marked as dirty, determining whether any of the data included in the first logical extent has been modified since the first logical extent was stored in the higher storage tier, and in response to determining that at least some of the data included in the first logical extent has been modified, sending one or more instructions to use the modified data to update corresponding portions of the data stored in the first physical storage location in the higher storage tier.

Other aspects and embodiments of the present invention will become apparent from the following detailed description, which, when taken in conjunction with the drawings, illustrate by way of example the principles of the invention.

DETAILED DESCRIPTION

Figure 1:
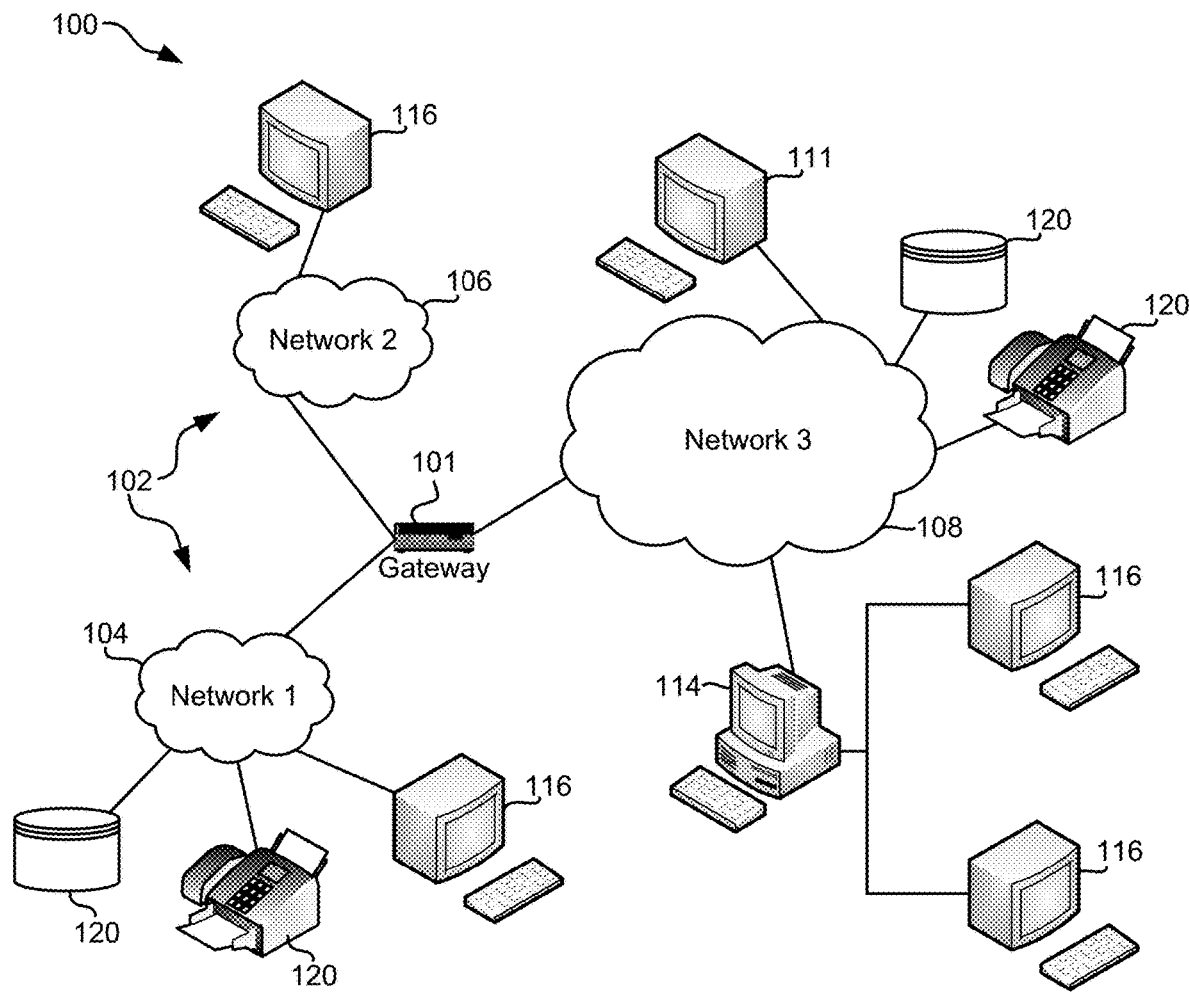
FIG. 1 is a representational view of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing efficient data management multi-tier storage architectures by limiting the number of rewrites performed on the same block of data in higher performance storage tiers by consider whether a data extent being migrated to a higher performance storage tier was stored at some physical location of the higher performance storage tier in the recent past. By implementing such embodiments as those described herein, various improvements may desirably be achieved, e.g., as will be described in further detail below.

In one general embodiment, a computer-implemented method includes: receiving an unmap command which corresponds to a first logical extent located in a higher storage tier of a multi-tiered data storage system having the higher storage tier and a lower storage tier, each storage tier comprising a plurality of hardware-based data storage devices, unmapping the first logical extent from a first physical storage location in the higher storage tier, marking the first physical storage location as dirty, storing information which links the first logical extent to the first physical storage location, receiving a map command which corresponds to the first logical extent, determining whether the first physical storage location is still marked as dirty, in response to determining that the first physical storage location is still marked as dirty, determining whether any data included in the first logical extent has been modified since the first logical extent was stored in the higher storage tier, and in response to determining that at least some of the data included in the first logical extent has been modified, using the modified data to update corresponding portions of the data stored in the first physical storage location.

In another general embodiment, a computer program product includes a computer readable storage medium having program instructions embodied therewith. The computer readable storage medium is not a transitory signal per se. Moreover, the program instructions readable and/or executable by one or more processors to cause the one or more processors to perform a method which includes: receiving, by the one or more processors, an unmap command which corresponds to a first logical extent located in a higher storage tier of a multi-tiered data storage system having the higher storage tier and a lower storage tier, each storage tier comprising a plurality of hardware-based data storage devices; unmapping, by the one or more processors, the first logical extent from a first physical storage location in the higher storage tier; marking, by the one or more processors, the first physical storage location as dirty; storing, by the one or more processors, information which links the first logical extent to the first physical storage location; receiving, by the one or more processors, a map command which corresponds to the first logical extent; determining, by the one or more processors, whether the first physical storage location is still marked as dirty; in response to determining that the first physical storage location is still marked as dirty, determining, by the one or more processors, whether any data included in the first logical extent has been modified since the first logical extent was stored in the higher storage tier; and in response to determining that at least some of the data included in the first logical extent has been modified, using, by the one or more processors, the modified data to update corresponding portions of the data stored in the first physical storage location.

In yet another general embodiment, a computer-implemented method includes: monitoring a current temperature corresponding to a first logical extent located in a higher storage tier of a multi-tiered data storage system having the higher storage tier and a lower storage tier, each storage tier comprising a plurality of hardware-based data storage devices, determining whether the current temperature is outside a predetermined range, sending one or more instructions to unmap the first logical extent in response to determining that the current temperature is outside the predetermined range, receiving an indication that the first logical extent has been unmapped from a first physical storage location in the higher storage tier, sending one or more instructions to mark the first physical storage location as dirty, sending one or more instructions to store information which links the first logical extent to the first physical storage location, receiving data corresponding to the first logical extent from the higher storage tier, sending the data corresponding to the first logical extent to the lower storage tier, monitoring the current temperature corresponding to the first logical extent located in the lower storage tier, determining whether the current temperature is outside the predetermined range, sending a request for the data corresponding to the first logical extent in response to determining that the current temperature is not outside the predetermined range, receiving the data corresponding to the first logical extent from the lower storage tier, sending the data corresponding to the first logical extent to the higher storage tier, determining whether the first physical storage location is still marked as dirty, in response to determining that the first physical storage location is still marked as dirty, determining whether any of the data included in the first logical extent has been modified since the first logical extent was stored in the higher storage tier, and in response to determining that at least some of the data included in the first logical extent has been modified, sending one or more instructions to use the modified data to update corresponding portions of the data stored in the first physical storage location in the higher storage tier.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
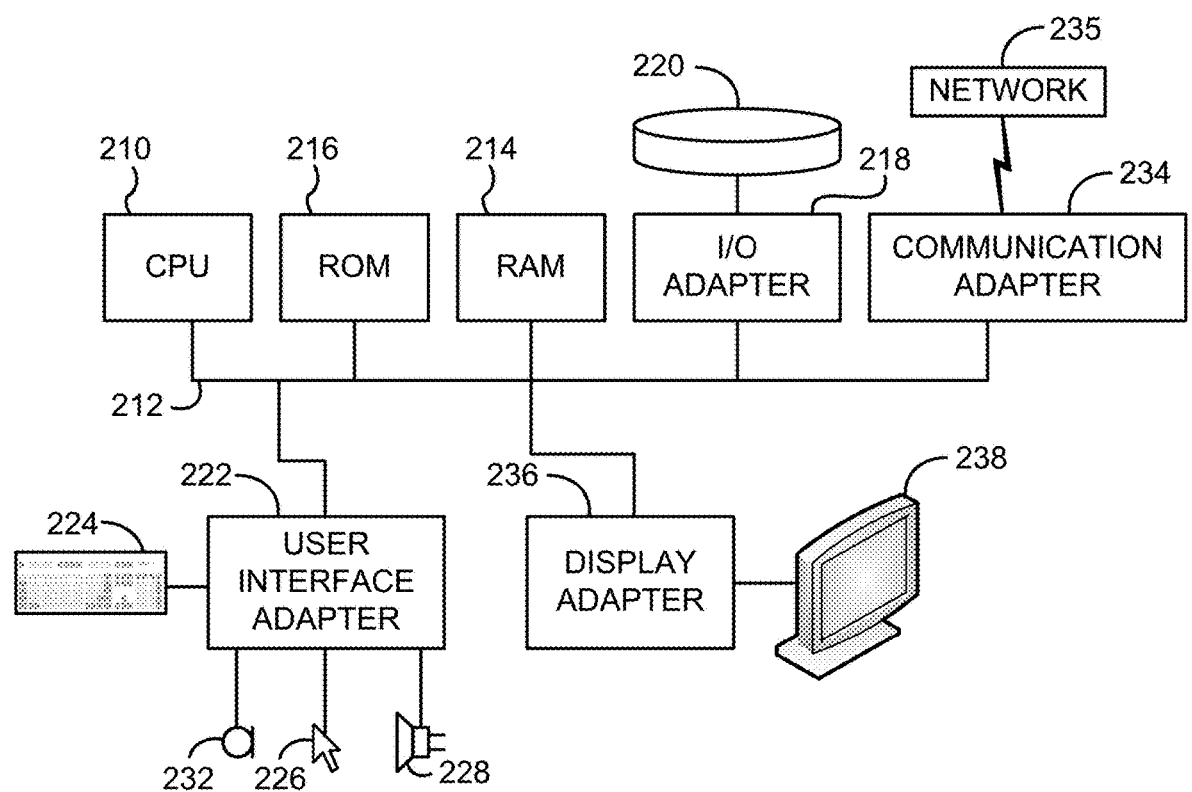
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
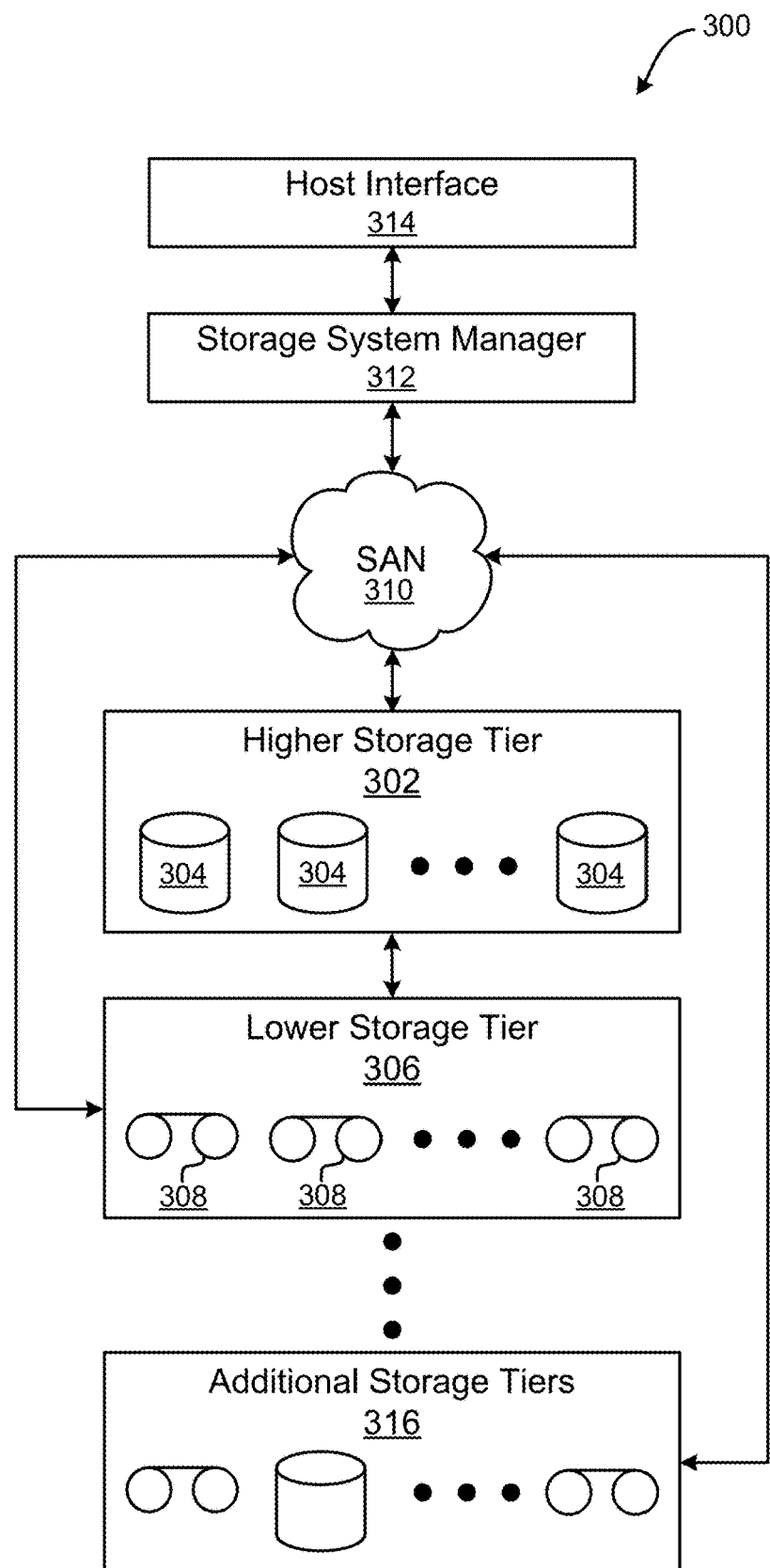
FIG. 3 is a representational view of a multi-tiered data storage system in accordance with one embodiment.

Now referring to FIG. 3, a high level representation of a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. Moreover, the higher storage tier(s) 302 preferably may include one or more random access and/or direct access hardware-based data storage devices, e.g., higher storage media 304, such as hard disks in hard disk drives (HDDs), nonvolatile memory (NVM), solid state memory in SSDs, flash memory, SSD arrays, flash memory arrays, etc., and/or other higher performing storage noted herein or known in the art. The lower storage tier(s) 306 may preferably include one or more lower performing hardware-based data storage devices, e.g., lower storage media 308, including sequential access media such as magnetic tape in tape drives and/or optical media, slower accessing HDDs, slower accessing SSDs, etc., and/or other lower performing storage (e.g., at least relative to the higher performance storage) noted herein or known in the art. Accordingly, it should be noted that a higher storage tier is also referred to herein as a "higher performance storage tier", while a lower storage tier is also referred to herein as a "lower performance storage tier", neither of which are intended to limit the invention. Moreover, one or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performance storage environment, and remaining storage tiers, including lower storage tier 306 and additional storage tiers 316 may include any combination of SSDs, HDDs, tape drives, etc., for storing data in a lower performance storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Data storage systems having multiple storage tiers with different performance levels may include additional data management functionality. For instance, a monitoring daemon and/or a central hybrid storage controller may be used to orchestrate which storage tier certain data is stored on depending on various factors. As a result, multi-tiered data storage systems may be able to achieve efficient data storage performance at reasonable costs by utilizing each of the storage tiers. For instance, seamless data migration between the higher and lower storage tiers based on hot spot identification and/or heat maps may significantly improve operating efficiency of a multi-tiered data storage system. Moreover, the unit by which the data is migrated between the tiers of the data storage system is called an "extent" or a "logical extent", which may vary in size and can even be as large as a few hundred megabytes. According to an illustrative approach, a logical extent may include 256 MB of data included therein.

Figure 4:
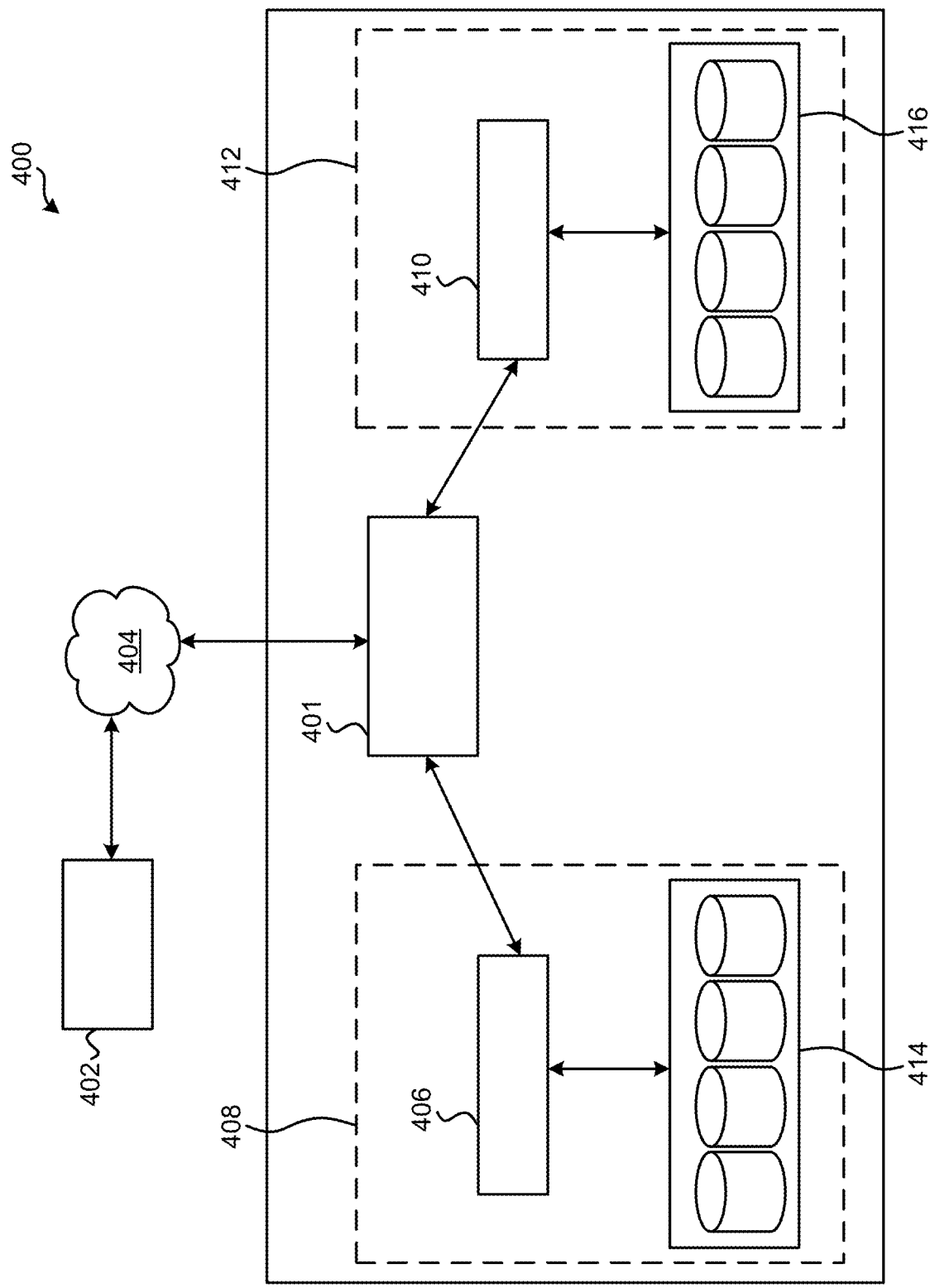
FIG. 4 is a representational view of a multi-tiered data storage system in accordance with one embodiment.

Accordingly, FIG. 4 includes another multi-tiered data storage system 400 which is illustrated according to another embodiment. As an option, the present data storage system 400 may be implemented in conjunction with features from any other embodiment listed herein, such as those described with reference to the other FIGS., such as FIG. 3. However, such data storage system 400 and others presented herein may be used in various applications and/or in permutations which may or may not be specifically described in the illustrative embodiments listed herein. Further, the data storage system 400 presented herein may be used in any desired environment. Thus FIG. 4 (and the other FIGS.) may be deemed to include any possible permutation.

Looking to FIG. 4, the data storage system 400 is shown as being coupled to a host (e.g., user) 402. Although the data storage system 400 is only coupled to one host 402 in the present embodiment, any number of hosts, users, other storage systems, etc. may be coupled to the data storage system 400 depending on the desired approach. Moreover, the host 402 may be coupled to the data storage system 400 using a wireless connection, e.g., WiFi, Bluetooth, a cellular network, etc.; a wired connection, e.g., a cable, a fiber-optic link, a wire, etc.; etc., or any other type of connection which would be apparent to one skilled in the art after reading the present description.

The host 402 may be indirectly coupled to a central hybrid storage controller 401 (e.g., a processor) as well as various other components in the data storage system 400 via a network 404. The network 404 may be a SAN, e.g., as described above, but may include any desired type of network depending on the approach. Accordingly, in some embodiments, the central hybrid storage controller 401 may process commands (e.g., requests) received from the host 402. For example, an unmap command may be received by the central hybrid storage controller 401 from the host 402 whereby the central hybrid storage controller 401 may issue a number of requests and/or instructions to the lower storage tier controller 406, the higher storage tier controller 410, and/or any other components of the data storage system 400, such that the unmap command may be successfully performed. It follows that the central hybrid storage controller 401 may communicate with the lower storage tier controller 406 in addition to the higher storage tier controller 410.

Accordingly, the central hybrid storage controller 401 is also coupled to a lower storage tier controller 406, and a higher storage tier controller 410. The lower storage tier controller 406 is in turn electrically coupled to a plurality of lower performance hardware-based data storage devices 414 at a lower storage tier 408. Depending on the approach, the lower performance hardware-based data storage devices 414 may include sequential access media, such as magnetic tape in tape drives and/or optical media, slower accessing HDDs, etc., and/or other lower performing data storage devices noted herein or known in the art.

Moreover, the higher storage tier controller 410 is electrically coupled to a plurality of higher performance hardware-based data storage devices 416 at a higher storage tier 412. Depending on the approach, the higher performance hardware-based data storage devices 416 may include one or more random access and/or direct access hardware-based data storage devices, e.g., such as solid state memory in SSDs, flash memory, SSD arrays, flash memory arrays, etc., and/or other higher performing storage devices (e.g., at least relative to the lower performance hardware-based data storage devices 414) noted herein or known in the art.

While each of the data storage tiers 408, 412 of data storage system 400 may have a plurality of hardware-based data storage devices having different performance characteristics (e.g., levels) associated therewith, it should be noted that the terms "higher" and "lower" are in no way intended to be limiting. Rather, "higher" and "lower" are intended to at least be in relation to each other. Thus, characteristically hardware-based data storage devices in the higher storage tier 412 may have quicker data access times, reduced latency, etc. in relation to hardware-based data storage devices in the lower storage tier 408. According to an exemplary approach, which is in no way intended to limit the invention, the higher data storage tier 412 may include a SSD based storage medium, while the lower data storage tier 414 may include an HDD based storage medium.

Although the central hybrid storage controller 401 is illustrated as being directly coupled to each of the lower storage tier controller 406 and the higher storage tier controller 410, in other approaches, the lower storage tier controller 406 and/or the higher storage tier controller 410 may actually be implemented in the central hybrid storage controller 401. Accordingly the central hybrid storage controller 401 may communicate and interact with the lower and/or higher storage tiers 408, 414 directly. In still other approaches, one or more of the controllers may be connected by another network. For example, looking now to FIG. 5, a data storage system 500 is shown according to another embodiment in which the central hybrid storage controller 401, the lower storage tier controller 406, and the higher storage tier controller 410 are coupled to each other over a network 502. It should be noted that FIG. 5 illustrates a variation of the embodiment of FIG. 4 and therefore, various components of FIG. 5 have common numbering with those of FIG. 4.

Depending on the configuration of system 500, the type of network 502 may vary. For example, in some approaches the central hybrid storage controller 401, the lower storage tier controller 406, and the higher storage tier controller 410 may be implemented in a multi-tiered data storage system 500 which is relatively localized. Thus, network 502 may be a LAN. However, in other approaches the central hybrid storage controller 401, the lower storage tier controller 406, and the higher storage tier controller 410 may be may be implemented in a multi-tiered data storage system 500 which spreads over greater distances (e.g., are geographically separated). Thus, network 502 may be a WAN, e.g., such as the Internet, PSTN, internal telephone network, etc. in other approaches. In still other approaches, a single network may be used to connect each of the central hybrid storage controller 401, the lower storage tier controller 406, and the higher storage tier controller 410 with the host 402.

Figure 5:
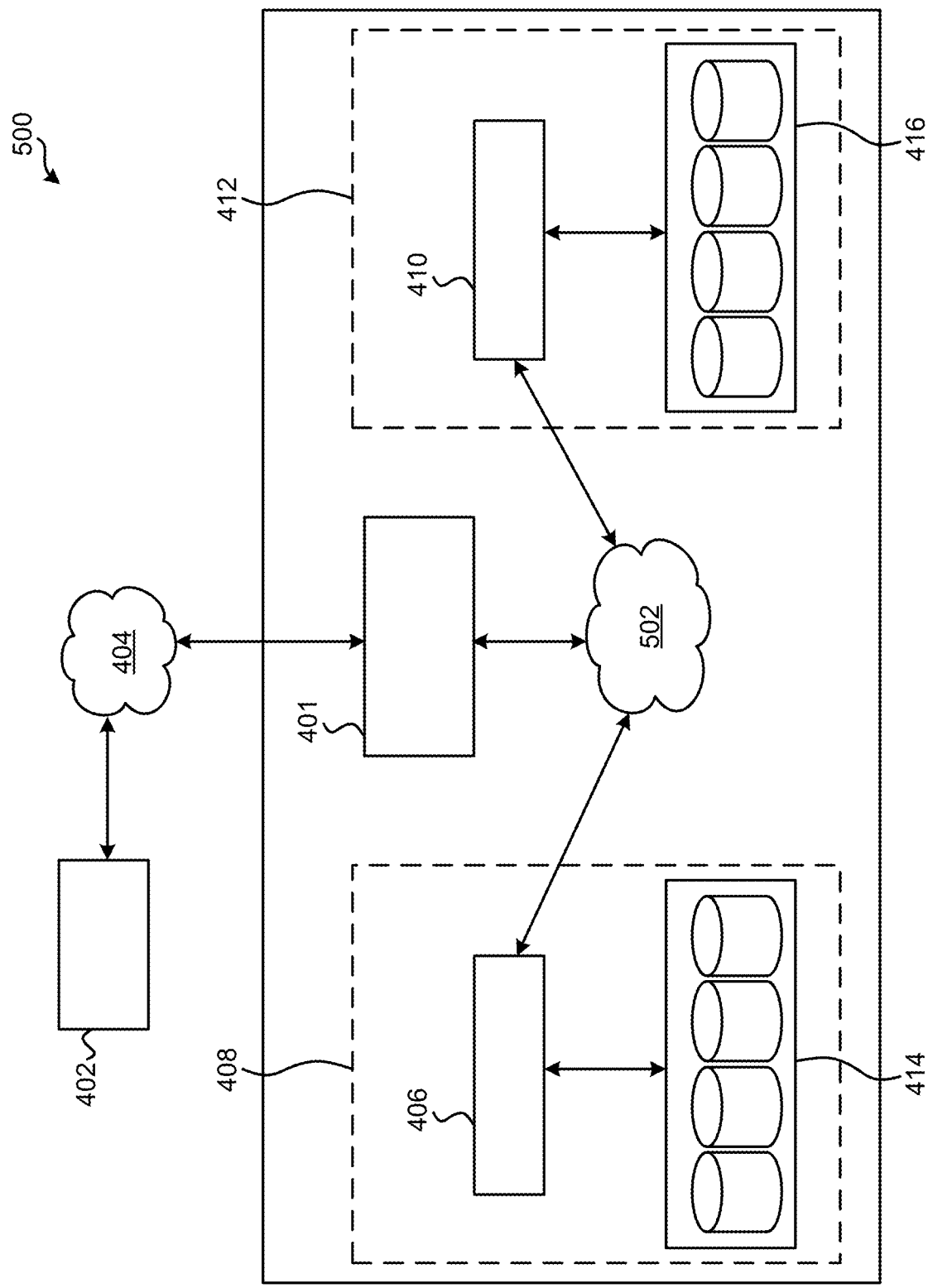
FIG. 5 is a representational view of a multi-tiered data storage system in accordance with one embodiment

Referring now to both FIGS. 4 and 5, the difference in performance between the lower and higher storage tiers 408, 414 may desirably be utilized improve data storage. For instance, central hybrid storage controller 401 may be used to manage the physical storage location of different data depending on its frequency of use, user input, sensitivity of the data, etc. For example, data that is frequently accessed by an application that is response time sensitive might be stored on SSD, while data that is infrequently accessed and for which a higher response time is more tolerable might be stored on HDD or magnetic tape. Moreover, the central hybrid storage controller 401 may include a tiering data relocator in some approaches which may be used to actually manage, coordinate, cause, etc., the relocation of data from one of the data storage tiers to the other, e.g., according to any one of the various approaches described herein. In other words, the central hybrid storage controller 401 may be able to (e.g., configured to) manage, coordinate, cause, etc., the relocation of at least one logical extent from one or more of the hardware-based data storage devices in a lower storage tier (in which the at least one logical extent is stored), to one or more of the hardware-based data storage devices in the higher storage tier, and vice versa. The central hybrid storage controller 401 may also include memory (e.g., RAM) which may be used to transition (e.g., migrate) data between the lower and higher storage tiers 408, 414, e.g., as would be appreciated by one skilled in the art after reading the present description.

This ability to accurately and efficiently transfer logical extents between the different tiers of a multi-tiered data storage system is particularly desirable for situations in which the temperature corresponding to data in a logical extent fluctuates over time. Again, the cost per unit (e.g., Gigabyte) of storage is typically higher for higher performance (e.g., faster) memory than it is for relatively lower performance (e.g., slower) memory, at least relative to each other. Thus, the capacity of a higher data storage tier is typically smaller than the capacity of a lower data storage tier. In order to maintain an efficient use of the higher performing, yet typically smaller, data storage tier, algorithms may be implemented to relocate data based on a temperature associated therewith. For example, "hotter" data may be migrated towards the higher storage tier (e.g., promoted), while "colder" data is migrated towards the slower tier (e.g., demoted). In the present context, the heat (e.g., "hotter" and "colder") of data refers to the rate (e.g., frequency) at which the data is updated. Memory blocks that are considered "hot" or "hotter" tend to have a frequent updated rate, while memory blocks that are considered "cold" or "colder" have an update rate which is at least slower than that of hot blocks. However, additional factors may be incorporated into the determination of the relative heat of a given portion of data, e.g., such as read frequency. It follows that this promotion and demotion process of data actually relocates the data from one tier to another, and may even be performed without the knowledge of an application that is running.

Moreover, certain applications which are implemented on multi-tiered data storage systems are executed on a periodic basis. For instance, batch processing may be performed periodically, e.g., at end of each week or month. For such applications which are performed in a periodic manner, the same set of data extents may switch between hot and cold states at an at least somewhat consistent frequency. In other words, certain portions of the data stored in a multi-tiered data storage system may be accessed more or less frequently in a reoccurring fashion. Furthermore, as portions of data switch between cold and hot states in a cyclical manner, corresponding data extents may be transitioned between the different tiers of memory in a cyclical manner also.

According to an example, during a period of high activity where the frequency of access to a particular data extent stored on a lower storage tier increases, the temperature corresponding to that data increases as well. Once the temperature rises high enough, the data extent is preferably transferred from the lower performance storage tier to a higher performance storage tier. However, as the data extent is accessed less frequently, the temperature corresponding thereto decreases as well. Thus, the data extent is preferably transferred back to the lower performance storage tier from the higher performance storage tier once the temperature falls low enough. It follows that data extents may continue moving back and forth between the higher and lower performance tiers periodically.

As data is repeatedly transitioned between the storage tiers as the temperature associated therewith fluctuates over time, data is repeatedly written to the higher performance data storage tiers. However, as mentioned above, some higher performance data storage tiers have a limited write endurance. In other words, some higher performance data storage tiers (e.g., such as SSDs) may only be able to undergo a finite number of write cycles before the memory cells therein begin to wear down and eventually fail. Thus, transitioning data between storage tiers of a multi-tiered data storage system consumes a certain amount of system resources. However, alternatively choosing to forego thermal regulation of the data stored in the system significantly detriments efficiency of the system as well.

Conventional products attempt to address these issues experienced by implementing wear-leveling in multi-tiered storage. Wear-leveling attempts to achieve an even distribution of write cycles across all memory cells in a data storage tier, thereby achieving an about equal wear rate for the various memory cells in the tier. Yet, this process only addresses the relative wear rate of each memory cell with respect to each other and does not prolong the effective lifetime of the data storage tier as a whole. Accordingly, conventional products have been unable to successfully address memory breakdown while also maintaining efficient memory performance.

In sharp contrast to these conventional shortcomings, various embodiments described herein include processes which are able to successfully prolong the expected lifetime of higher performance storage tiers. Moreover, this increase to the longevity of the higher performance storage tiers is achieved while also increasing efficiency of the storage system as a whole. Accordingly, various ones of the embodiments described herein may improve performance of a storage system on two fronts. For instance, not only are some of the embodiments included herein able to reduce the amount of write operations performed on higher performance data storage tiers, but also while maintaining accurate thermal regulation of the data stored in the system, e.g., as will be described in further detail below.

During the time that a data extent is stored on a given tier of a multi-tiered data storage system, the actual data included in the data extent may be modified as a result of any number of operations. For instance, the data may be modified in response to a delete request, a write operation, an update operation, etc. being performed. It follows that the amount of data in a given extent which is actually modified may vary depending on the approach. For instance, in some approaches the portion of the data in an extent that is modified may be a few kilobytes, while in other approaches all of the data in the extent may be modified. However, in other approaches, none of the data in a data extent may be modified during the time that the data extent is stored on one of the tiers of a multi-tiered data storage system. For example, the data included in a given data extent may only be read while it is stored on a higher performance tier of a multi-tiered data storage system.

Thus, the embodiments included herein preferably consider the amount of data in a data extent which has actually changed since a last time the data extent was stored in a given tier of memory. Accordingly, some of the embodiments included herein are able to improve the expected lifetime of memory by reducing the number of rewrites are performed to the memory. This differs significantly from conventional processes, such as wear-leveling, by considering whether a data extent being migrated to a storage tier has already been stored at a physical location of that storage tier in the recent past. Accordingly, in some situations the same physical location may be reused to store at least a portion of a data extent, e.g., as will soon become apparent.

Figure 6:
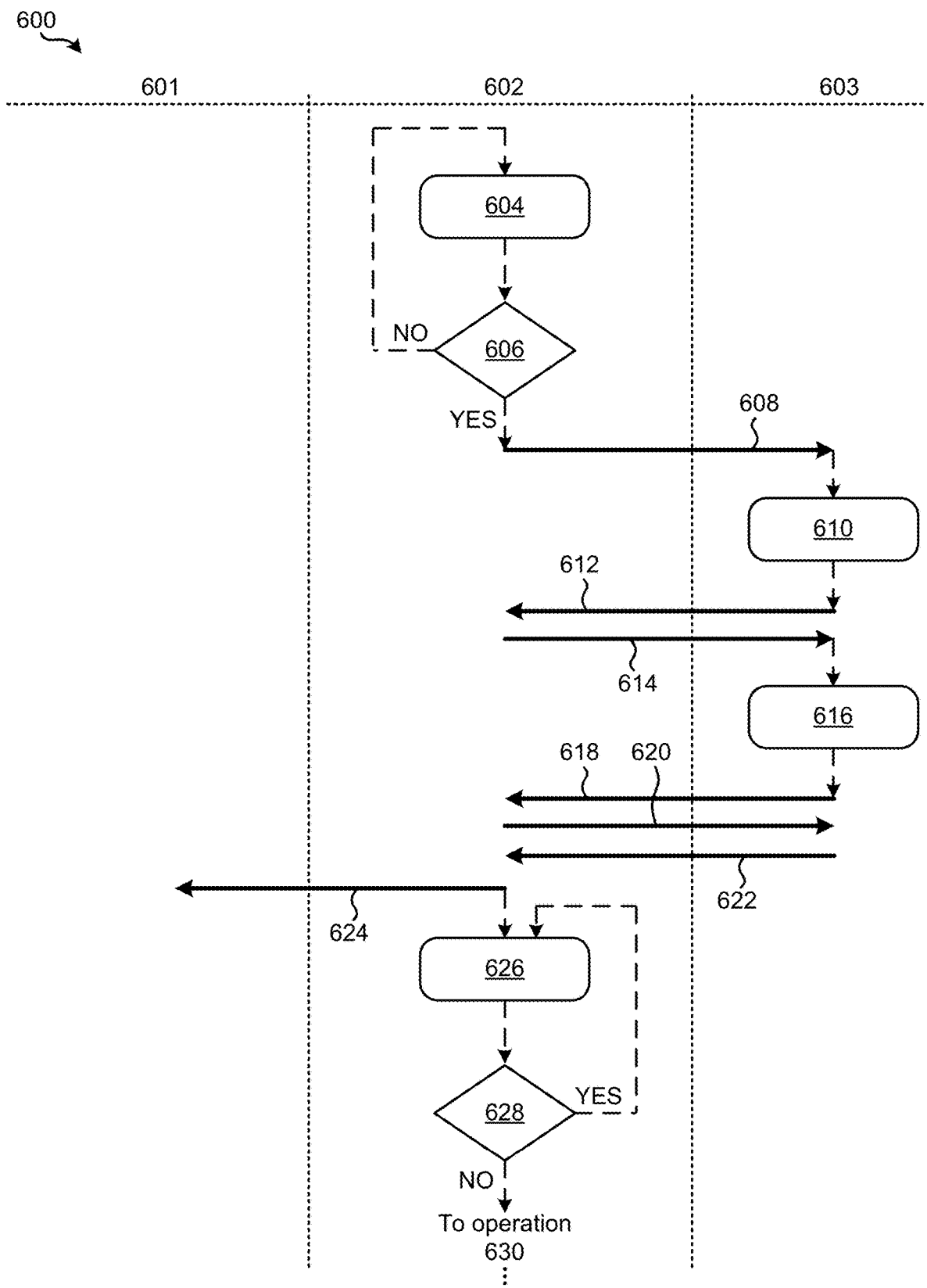
FIG. 6 is a flowchart of a method in accordance with one embodiment.
Figure 6:
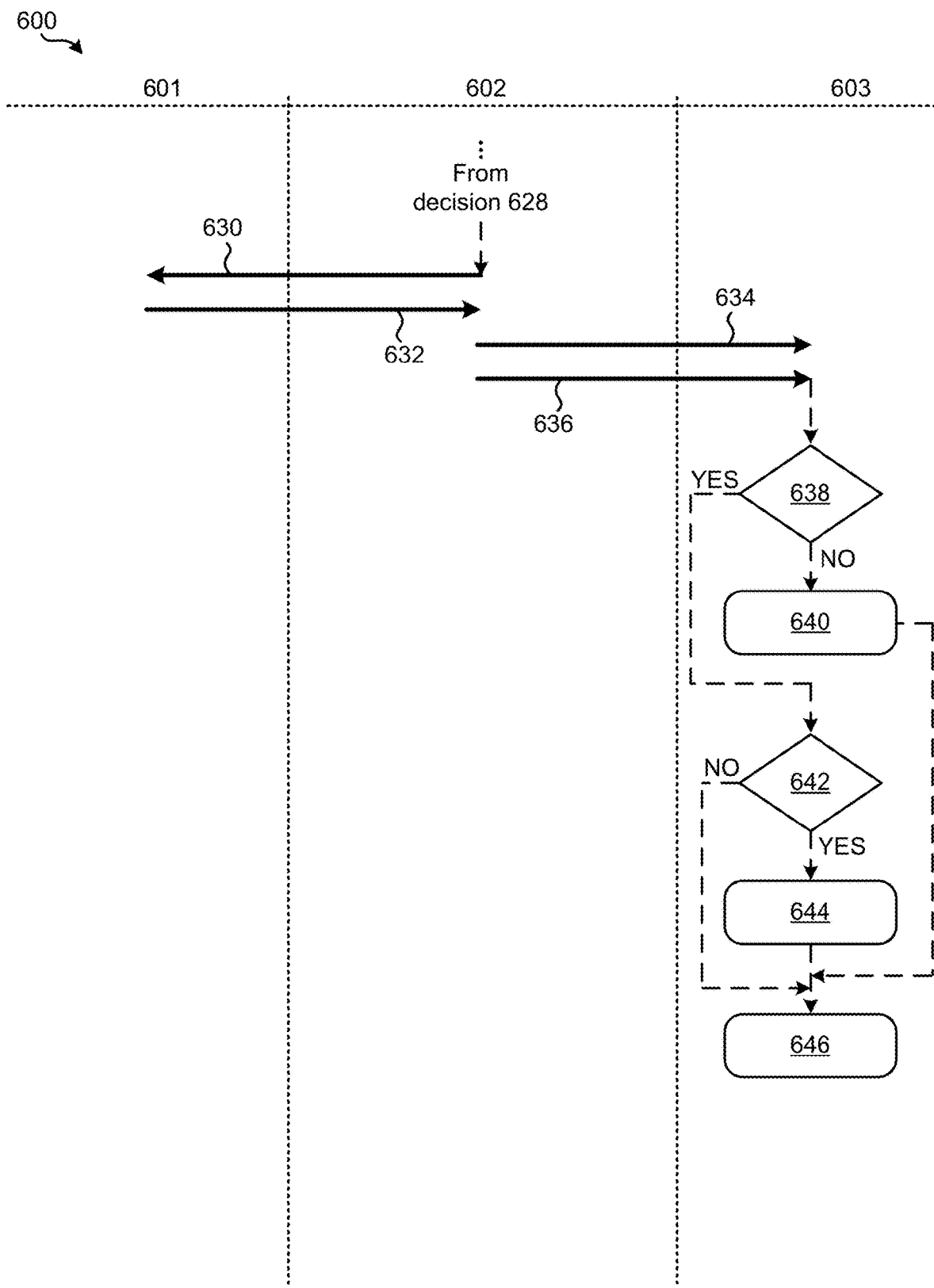

Now referring to FIG. 6, a flowchart of a computer-implemented method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, each of the nodes 601, 602, 603 shown in the flowchart of method 600 may correspond to one or more processors positioned at a different location in a multi-tiered data storage system. Moreover, each of the one or more processors are preferably configured to communicate with each other.

In various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an ASIC, a FPGA, etc., combinations thereof, or any other suitable computing device known in the art.

As mentioned above, FIG. 6 includes different nodes 601, 602, 603, each of which represent one or more processors, controllers, computer, etc., positioned at a different location in a multi-tiered data storage system. For instance, node 601 may include one or more processors which are electrically coupled to a lower performance storage tier of a multi-tiered data storage system (e.g., see lower storage tier 408 of FIGS. 4-5 above). Moreover, node 603 may include one or more processors which are electrically coupled to a higher performance storage tier of a multi-tiered data storage system (e.g., see higher storage tier 412 of FIGS. 4-5 above). Accordingly, a storage tier may be coupled to each of nodes 601 and 603 respectively, each of the storage tiers including a plurality of hardware-based data storage devices which have different performance characteristics associated therewith. Furthermore, node 602 may include one or more processors which are configured as a central hybrid storage controller (e.g., see 401 of FIGS. 4-5 above). The central hybrid storage controller may be in communication with the one or more processors at each of nodes 601 and 603.

It follows that commands, data, requests, etc. may be sent between each of the nodes 601, 602, 603 depending on the approach. Moreover, the processes included in method 600 may include one or more interfaces which may be implemented in a flash access protocol, e.g., such as NVM Express (NVMe), and work at the flash translation layer. According to an illustrative approach, node 603 may include a flash controller which is electrically coupled to the higher performance storage tier, and also in communication with a central hybrid storage controller at node 602. Accordingly, the flash controller at node 603 may implement a flash translation layer which is able to map and/or unmap logical block addresses (LBAs) to physical storage locations (e.g., blocks) in the memory of the higher performance storage tier, e.g., as would be appreciated by one skilled in the art after reading the present description. Moreover, it should be noted that the various processes included in method 600 are in no way intended to be limiting, e.g., as would be appreciated by one skilled in the art after reading the present description. For instance, data sent between any two or more of the nodes may be prefaced by a request to do so in some approaches.

Looking to FIG. 6, operation 604 of method 600 is performed by the one or more processors at node 602. There, operation 604 includes monitoring a current temperature corresponding to logical extents located in a higher storage tier of a multi-tiered data storage system. As mentioned above, node 602 may include a central hybrid storage controller which is in communication with both a lower performance storage tier and a higher performance storage tier. Thus, operation 604 may be performed by central hybrid storage controller in order to monitor the current temperature corresponding to logical extents stored in a higher storage tier coupled to node 603. However, the central hybrid storage controller may also be able to monitor the current temperature corresponding to logical extents stored in a lower storage tier coupled to node 601 (e.g., see processes 626, 628 below).

Furthermore, decision 606 includes determining whether the current temperature corresponding to any of the respective logical extents in the higher storage tier are outside a predetermined range. In other words, decision 606 includes determining whether the current temperature corresponding to any of the logical extents located in a higher storage tier of a multi-tiered data storage system has decreased to the point that the data stored in the logical extent should no longer be stored on the higher storage tier. As mentioned above, higher data storage tiers typically include higher performance data storage devices. However, the capacity of a higher performance data storage tier may be smaller than the capacity of a lower data storage tier in view of their relative price per unit of data storage. Thus, in order to maintain an efficient use of the higher performing, yet typically smaller capacity, data storage tier, it is preferably reserved for hot, or at least hotter, data having more frequent updated rates than cold or colder data. Conversely, logical extents which include data that is considered cold or colder are preferably stored on the lower performing, yet typically larger capacity, data storage tier.

It should be noted that "outside a predetermined range" is in no way intended to limit the invention. Rather than determining whether a value is outside a predetermined range, equivalent determinations may be made, e.g., as to whether a value is above a threshold, whether an absolute value is above a threshold, whether a value is below a threshold, etc., depending on the desired approach. Moreover, the predetermined range may be set by a user, calculated based on storage system settings, adapt to current workloads, etc., depending on the desired approach.

It should also be noted that although a given logical extent may include data which is hot (frequently accessed, updated, added to, etc.) at a given point in time, the temperature of the data may decrease as time progresses. Thus, although it may be desirable to store the data of a given logical extent on a higher storage tier at time t while the data is hot, it may no longer be desirable to do so at time t+x when the data has become cold (e.g., not hot). Moreover, the inverse is true for cold data stored on the lower storage tier which becomes sufficiently hot over time. As data becomes sufficiently hot, it is preferably transferred to a higher storage tier such that data operations may be performed more efficiently on the data as it is more frequently accessed.

Referring still to FIG. 6, the flowchart of method 600 may return to operation 604 from decision 606 in response to determining that the current temperature is not outside the predetermined range for any of the respective logical extents. The current temperatures corresponding to the logical extents may thereby continue to be monitored, preferably such that any changes may be identified. Alternatively, method 600 proceeds to operation 608 in response to determining that the current temperature is outside the predetermined range for at least one of the respective logical extents, referred to hereafter as the "first logical extent". It should be noted that although the remainder of the flowchart is described according to a situation in which it is determined that the current temperature is outside the predetermined range for only one of the respective logical extents, this is in no way intended to be limiting. In other approaches, the temperature corresponding to any number of the logical extents in the higher storage tier being monitored may have current values which are determined to be outside respective predefined ranges. Accordingly, any of the processes included in method 600 may be performed with respect to more than one logical extent, e.g., as would be appreciated by one skilled in the art after reading the present description.

Operation 608 includes sending one or more instructions to unmap the first logical extent. As shown, the one or more instructions are sent from the one or more processors at node 602 to the one or more processors at node 603. In response to receiving the unmap command from the one or more processors at node 602, the one or more processors at node 603 may actually unmap the first logical extent from a first physical storage location in the higher storage tier. See operation 610. The process of unmapping the first logical extent may include any steps which would be apparent to one skilled in the art after reading the present description. For example, an unmap command may be received by the one or more processors at node 603, whereby the one or more processors may issue a number of requests and/or instructions to a space efficient manager, monitoring daemon, tiering data relocator, etc., and/or any other components coupled to the higher performance storage tier, such that the unmap command may be successfully performed.

Furthermore, operation 612 includes sending an indication that the first logical extent has been unmapped and the data included therein is ready to be sent to the lower storage tier. As shown, the indication may be sent from the one or more processors at node 603 to the one or more processors at node 602. Accordingly, in response to receiving the indication included in operation 612, the one or more processors at node 602 may sending one or more instructions to mark the first physical storage location as "dirty". See operation 614. The one or more processors at node 603, in response to receiving the one or more instructions in operation 614, may mark the first physical storage location as dirty. See operation 616. Depending on the approach, a physical storage location in memory may be marked as dirty a number of different ways. For instance, in some approaches a physical storage location may be marked as dirty by setting a flag which corresponds to the physical storage location in a lookup table. In other approaches, a physical storage location may be marked as dirty by amending an identifier corresponding to the physical storage location accordingly.

Marking the physical storage location as "dirty" allows the higher storage tier, as well as the storage system as a whole, to keep track of the fact that although the first logical extent has been unmapped from the higher storage tier, valid data is still stored in the first physical storage location on the higher storage tier. This valid data preferably remains stored in the first physical storage location as an inactive copy, such that the data of the first logical extent may remain stored on the higher storage tier, even after the active copy of the data has been transitioned to the one or more processors at node 602 and/or the lower storage tier.

By maintaining this inactive copy of the data in the physical storage location on the higher performance storage tier rather than deleting the data after it is transitioned elsewhere in the multi-tiered data storage system, the number of future write cycles performed on the higher performance storage tier may desirably be reduced. More specifically, data which has not been altered (e.g., modified) may be transitioned back to the higher performance storage tier at a future point in time without performing any re-write (e.g., erase and subsequent write) operations. As a result, the higher storage tier avoids performing erase operations in certain situations, e.g., as will be described in further detail below. This allows the system to achieve a significant improvement to the expected lifetime of the higher performance storage tier, particularly for approaches which include higher performance memory (e.g., such as SSDs) which is only be able to undergo a finite number of write cycles before the memory cells therein begin to deteriorate and eventually fail. Moreover, this increase to the longevity of the higher performance storage tiers is achieved while also increasing efficiency of the storage system as a whole by maintaining accurate thermal regulation of the data stored in the system.

Moreover, the process of actually marking the physical storage location as "dirty" may include using an interface Interface A which may be implemented in a flash access protocol, e.g., such as NVM Express (NVMe), and work at the flash translation layer. Accordingly, Interface A may be able to un-map the first logical extent (e.g., LBA in embodiments which include a higher storage tier having flash) and mark the associated physical block(s) as dirty. Interface A may also be able to mark the physical block(s) with which the first logical extent was associated and/or determine a unique identifier (e.g., a handle) corresponding to the first physical storage location. This unique identifier may be used at a later point in time to relocate the first physical storage location, e.g., as will be described in further detail below.

Internally, Interface A may be implemented using a flash translation layer, which may add the physical block(s) returned by Interface A to a pool that keeps track of physical storage locations (e.g., blocks) which have been marked as dirty. Accordingly, the garbage collector may be able to avoid reusing these dirty physical storage locations marked as dirty, for as long as possible. However, if a physical storage location marked as dirty is reused, then the handle corresponding to the physical storage location becomes invalid. The manner by which physical storage locations marked as dirty are reused is described in further detail below, and will soon become apparent.

Referring still to FIG. 6, after the physical storage location has been marked as dirty, the one or more processors at node 603 may send an indication back to node 602 that the one or more instructions received in association with operation 614 have successfully been performed. See operation 618. Moreover, the one or more processors at node 602 may send one or more instructions to store (e.g., maintain) information which links the first logical extent to the first physical storage location. See operation 620.

In response to receiving the one or more instructions in operation 620, the one or more processors at node 603 may store (e.g., maintain) information which links the first logical extent to the first physical storage location. The information may actually be stored in a lookup table, a designated location in the higher storage tier, the central hybrid storage controller, etc., depending on the desired approach. Once the information linking the first logical extent to the first physical storage location is stored, it may be available for later use in order to reconnect the data in the first logical extent to the first physical storage location. For example, the first data extent may be transitioned back to the higher storage tier at a later point in time in response to becoming hot again. Accordingly, the information linking the first logical extent to the first physical storage location may be accessed in order to determine how and/or where the data in the first logical extent should be stored on the higher storage tier, again which will be described in further detail below.

Operation 622 of method 600 further includes sending the data included in the first logical extent to the hybrid storage controller. Depending on the type of connection which exists between nodes 602 and 603, operation 622 may be performed by sending one or more packets of the data wirelessly, a stream of the data over a physical electrical connection (e.g., a wire), etc.

Even after the data included in the first logical extent has been received at node 602, it is preferred that the one or more processors at node 603 continue to monitor the first physical storage location. This is because, although the effective lifetime of the higher storage tier may be lengthened by maintaining inactive copies of data which corresponds to logical extents that have been transitioned to the lower storage tier, it is also preferred that the performance of the higher storage tier is not negatively affected as a result of doing so. Thus, the higher storage tier may be able to continue satisfying read, write, update, etc. requests which are received while the inactive copy of the data in the first logical extent remains stored in the higher storage tier. Free (e.g., unused and available) portions of the higher storage tier may be used first to satisfy requests which correspond to new logical extents and/or logical extents which are currently active in the higher storage tier. However, situations in which there are no more free physical storage locations in the higher storage tier may arise. In such situations, physical storage locations marked as dirty may be used (e.g., sacrificed) as a last resort to perform received data requests, rather than delaying and/or denying performance of the received requests, e.g., as alluded to above.

It is also preferred that the physical storage locations marked as dirty are used in a first-in-first-out (FIFO) manner to satisfy received data requests once there are no more free physical storage locations in the higher storage tier to do so. In other words, it is preferred that a physical storage location which has been marked as dirty for a longest amount of time is used to perform a received data request should there be no more free physical storage locations in the higher storage tier. However, in other approaches the physical storage locations marked as dirty may be used in a last-in-first-out (LIFO) manner, in an order which corresponds to an amount of data stored therein, in a prespecified order, in an order which corresponds to a relative health value of each of the physical storage locations, etc.

In order to use a physical storage location marked as dirty to perform a received data request, the physical storage location may be stripped of its designation as being "dirty". Moreover, the data stored in the physical storage location may be removed before additional data may be stored therein. According to an illustrative approach, which is in no way intended to limit the invention, physical storage locations may have three different designations based on a current condition thereof. As described above, a physical storage location marked as "dirty" may signify that the physical storage location is in a special state for which the physical storage location previously included active data, but now contains an invalid copy of data that has an active copy stored elsewhere in the storage system. Accordingly the data in a physical storage location marked as dirty has not yet been erased, e.g., by a garbage collector. Moreover, a physical storage location marked as "free" has been erased (does not include any data stored therein) and is ready for use. Finally, a physical storage location marked as "active" may signify that a logical extent is currently mapped to the physical storage location, and therefore read and/or write operations are currently being performed.

According to these designations, a physical storage location in SSD marked as dirty may be re-marked as "free" in response to a garbage collection operation being performed on the physical storage location, thereby indicating that the physical storage location is available to store data. According to another illustrative approach, a physical storage location marked as dirty or free, may be re-marked as "active" in response to having a second logical extent (different than the first logical extent) being mapped thereto, e.g., as an initial step of a new write operation being performed. As a result, the higher storage tier, as well as the storage system as a whole, is able to keep track of which physical storage locations include valid data, active data, no data, etc., on the higher storage tier.

With continued reference to FIG. 6, the data corresponding to the first logical extent is received by the one or more processors at node 602 from the one or more processors coupled to the higher storage tier at node 603. Accordingly, the data corresponding to the first logical extent may in turn be sent to the lower storage tier at node 601. See operation 624. However, prior to sending the data corresponding to the first logical extent to the lower storage tier, the one or more processors at node 602 may perform one or more processes involving the data. For example, in some approaches the central hybrid storage controller may update a logical-to-physical table (LPT) which indicates where the data included in the first logical extent is physically stored in the storage system.

It should also be noted that although the data corresponding to the first logical extent is shown as being sent to node 602 before it is sent to node 601 at the lower storage tier, this in in no way intended to be limiting. For instance, in other approaches the data corresponding to the first logical extent may be sent directly to the lower storage tier from the higher storage tier. It follows that in some approaches the higher storage tier and the lower storage tier may be able to communicate with each other, e.g., using a physical and/or wireless connection extending therebetween (e.g., see network 502 in FIG. 5 above).

The current temperature corresponding to the logical extents stored on the lower storage tier are also preferably monitored. Again, as data becomes hotter with increased use (e.g., reads, writes, etc.), it is preferably transferred from the lower performance storage tier to a higher performance storage tier which is better suited to satisfy the increased workload associated with the hot data. Accordingly, the one or more processors at node 602 may monitor a current temperature corresponding to logical extents located in the lower storage tier. See operation 626. In some approaches, logical extents which have been transferred to the lower storage tier from the higher storage tier may be given added attention compared to other logical extents stored on the lower storage tier. This is because the data which has already been transitioned between the higher and lower storage tiers may be more susceptible to being transitioned between the storage tiers again. Accordingly, the current temperature corresponding to logical extents which have been transitioned from the higher storage tier to the lower storage tier (such as the first logical extent) may be sampled more frequently, with greater accuracy, etc., compared to other logical extents stored on the lower storage tier.

In other approaches, certain logical extents which include data that is accessed on a reoccurring (e.g., periodic) basis may be identified and monitored accordingly. For instance, batch processing may be performed periodically, e.g., at end of each week or month. For such applications which are performed in a periodic manner, the same logical extents may fluctuate between hot and cold temperatures at an at least somewhat consistent frequency. In other words, certain portions of the data stored in a multi-tiered data storage system may be accessed more or less frequently in a reoccurring fashion. For example, periodic applications such as banking operations, repeated backup procedures, date and/or time based operations, etc. are performed repeatedly and usually at a set frequency. According to some approaches, migration algorithms may be implemented (e.g., by the central hybrid storage controller) to detect the existence and/or emergence of new periodic applications for a given storage system. Moreover, in response to identifying a periodic application, the central hybrid storage controller may initiate one or more of the various processes included in method 600 to achieve efficient and accurate management of the data used in such periodic applications. It follows that certain logical extents may be monitored more closely at times which correspond to experienced patterns of activity.

Furthermore, as portions of data switch between cold and hot temperatures in a repetitive manner, corresponding data extents may be transitioned between the different tiers of memory in a repetitive manner also. Accordingly, decision 628 includes determining whether the current temperature corresponding to the first logical extent is still outside the predetermined range. In other words, decision 628 includes determining whether the current temperature corresponding to the first logical extent is still cold enough that the data stored in the first logical extent should remain stored on the lower storage tier. However, it should be noted that decision 628 may include determining whether the current temperature corresponding to any of the logical extents stored on the lower storage tier is outside a predetermined range.

The flowchart of method 600 may return to operation 626 from decision 628 in response to determining that the current temperature corresponding to the first logical extent is still outside the predetermined range. The current temperature corresponding to the first logical extent, as well as other logical extents in the lower storage tier, may thereby continue to be monitored, preferably such that any changes may be identified. However, method 600 proceeds to operation 630 in response to determining that the current temperature corresponding to the first logical extent is no longer outside the predetermined range. In other words, method 600 proceeds to operation 630 in response to determining that the current temperature corresponding to the first logical extent has risen to the point that it should be transferred back to the higher storage tier.

There, operation 630 includes sending a request for the data corresponding to the first logical extent. As shown, the request is sent from the one or more processors at node 602 to the one or more processors at node 601. In response to receiving the request sent in operation 630, the lower storage tier may locate the data of the first logical extent, read the data from memory, and send the data to the one or more processors (e.g., central hybrid storage controller) at node 602. See operation 632. Furthermore, in response to receiving the data corresponding to the first logical extent from the lower storage tier at node 601, the one or more processors at node 602 may further send the data corresponding to the first logical extent to the higher storage tier. See operation 634.

In addition to receiving the data corresponding to the first logical extent, the one or more processors at node 603 may also receive a map command which pertains to the first logical extent. See operation 636. In preferred approaches, the map command specifies that the data corresponding to the first logical extent should be mapped to the first physical storage location, where the data corresponding to the first logical extent was previously stored. However, this may only be practical if the first physical storage location is still marked as being dirty. As described above, the higher storage tier may be able to continue satisfying read, write, update, etc. requests which are received while an inactive copy of the data in the first logical extent remains stored in the higher storage tier. However, situations in which there are no more free physical storage locations in the higher storage tier may arise. In such situations, physical storage locations marked as dirty may be used (e.g., sacrificed) to perform received data requests rather than delaying and/or denying performance of the received requests.

Thus, upon receiving the map command in operation 636, the one or more processors coupled to the higher storage tier may determine whether the first physical location is still marked as dirty. See decision 638. Depending on the approach, decision 638 may be performed by referencing a list of write operations performed on the higher storage tier, examining memory, accessing a LPT, etc. In response to determining that the first physical storage location is not still marked as dirty, method 600 proceeds to operation 640. There, operation 640 includes writing all of the data included in the first logical extent to a second physical storage location in the higher storage tier. Because the first physical storage location is no longer marked as being dirty, it may be concluded that the first physical storage location is being used to store a different logical extent, and is therefore no longer available to store data corresponding to the first logical extent. Accordingly, the data in the first logical extent may be stored at a second physical storage location which is different than the first physical storage location.

Selecting the second physical storage location may include determining whether any physical storage locations in the higher storage tier are currently marked as free (e.g., available to store data). As mentioned above, free (e.g., unused and available) physical storage locations in the higher storage tier are preferably used first to satisfy requests which correspond to new logical extents. Accordingly, a physical storage location in the higher storage tier marked as free may be selected as the second physical storage location.

However, there may be situations where there are no more free physical storage locations in the higher storage tier. In such situations, physical storage locations marked as dirty may be used (e.g., sacrificed) to store the first logical extent, rather than delaying and/or denying the first logical extent from being transitioned to the higher storage tier. It is also preferred that the physical storage locations marked as dirty are used in a FIFO manner to satisfy received data requests during times in which there are no more free physical storage locations in the higher storage tier to do so. Thus, a physical storage location in the higher storage tier which has been marked dirty a longest amount of time may be selected as the second physical storage location.

However, returning to decision 638, method 600 proceeds to decision 642 in response to determining that the first physical storage location is still marked as dirty. There, decision 642 includes determining whether any of the data included in the first logical extent has been modified (e.g., changed, updated, etc.) since the first logical extent was last stored at the first physical storage location in the higher storage tier. As described above, during the time that a data extent is stored on a given tier of a multi-tiered data storage system, the actual data included in the data extent may be modified as a result of any number of operations. For instance, the data may be modified in response to a delete request, a write operation, an update operation, etc. being performed. It follows that the amount of data in a given extent which has actually been modified may vary depending on the approach. For instance, in some approaches the portion of the data in an extent that has been modified may be a few kilobytes, while in other approaches all of the data in the extent may have been modified. However, in other approaches, none of the data in a data extent may have been modified during the time that the data extent was stored on one of the tiers of a multi-tiered data storage system. For example, the data included in a given data extent may have only been read while it was stored on the lower performance tier of the multi-tiered data storage system.

Thus, decision 642 considers the amount of data in a data extent which has actually changed since a last time the data extent was stored in a given tier of memory. According to some approaches, decision 642 may be determined by comparing the data in the first logical extent with the data that is stored in the first physical storage location. For example, an XOR process may be performed. In other approaches, decision 642 may be determined by referencing a list of operations performed at the lower storage tier while the first logical extent was stored thereon.

In response to determining that at least some of the data included in the first logical extent has been modified, method 600 proceeds to operation 644, which includes using (e.g., copying) the modified data to update the corresponding portions of the data stored in the first physical storage location. In other words, operation 644 includes only updating the portions of the data included in the first logical extent which have been modified.

The process of actually using the modified data to update the corresponding portions of the data stored in the first physical storage location may include using an interface Interface B which may be implemented in a flash access protocol, e.g., such as NVMe, and work at the flash translation layer. Accordingly, Interface B may be able to map the first logical extent to the first physical storage location, e.g., using a handle obtained by implementing Interface A as described above. In other words, Interface B may be able to map a physical storage location to a given logical extent. As mentioned above, Interface B may be able to determine whether the first physical storage location is still marked as dirty, as well as determine whether that handle is valid. This represents a situation in which the first physical storage location contains the data included in the first logical extent as it was when an active copy of the first logical extent was previously stored in the first physical storage location. Moreover, upon mapping the first logical extent back to the first physical storage location, Interface B may also modify the first physical storage location's marker to be "active", thereby representing that the first physical storage location currently has a logical extent mapped thereto, and therefore read and/or write operations are currently being performed.

Refraining from rewriting the unmodified portions of the data in the first logical extent improves performance of the higher storage tier significantly in more than one way. For instance, the amount of data written to the higher storage tier is reduced, thereby minimizing the number of write cycles performed on the higher storage tier. As a result, the expected lifetime of the higher storage tier may be lengthened, particularly in approaches where the higher storage tier includes one or more SSDs. Moreover, this increase to the expected lifetime of the higher storage tier is achieved while also ensuring that an accurate and updated representation of the first logical extent is stored in the higher storage tier as a result of maintaining a thermal regulation of the data stored in the system.

Following operation 644, the flowchart proceeds to operation 646, whereby method 600 may end. However, it should be noted that although method 600 may end upon reaching operation 646, any one or more of the processes included in method 600 may be repeated in order to continue monitoring the temperature of the various logical extents in the higher and/or lower storage tiers. In other words, any one or more of the processes included in method 600 may be repeated to maintain an efficient management of the data stored in a multi-tiered data storage system corresponding thereto.

However, returning to decision 642, in response to determining that none of the data included in the first logical extent has been modified, method 600 skips operation 644 and proceeds directly to operation 646, whereby method 600 may end. As a result, the current data stored in the first physical storage location is maintained, and no write cycles are performed on the higher storage tier. This also desirably increases the expected lifetime of the higher storage tier by avoiding the performance of unnecessary write cycles, while also maintaining an efficient and effective management of the data stored thereon, as described above.

Accordingly, regardless of the outcome of decision 642, portions of the data stored in the first physical storage location which correspond to unmodified data included in the first logical extent are not updated in order to re-map the first logical extent to the first physical storage location. Moreover, the determination as to which data is used to update the data stored in the first physical storage location is irrespective of the type of data (e.g., relocate writes, user writes, etc.) and the temperature of the data itself in the logical extent. Again, only data which has been modified while the first logical extent was stored on the lower storage tier is used to update the first physical location. This allows method 600 to be able to improve the expected lifetime of memory by maintaining an accurate representation of data and the operations performed on such data at various points in time and at different physical storage locations in a system, thereby reducing the number of write cycles performed. This differs significantly from conventional processes, such as wear-leveling, by considering whether a data extent being migrated to a storage tier has already been stored at a physical location of the storage tier in the past and only updating the portions of the data which have actually been modified since such a point in time (if any). Accordingly, in some situations the same physical location and the data stored in the same physical location may be reused to store at least a portion of a data extent.

As mentioned above, the various processes included in method 600 may be included in one or more interfaces which may be implemented in a flash access protocol, e.g., such as NVMe, by a flash controller which is electrically coupled to the higher performance storage tier. The flash controller may also be able to implement a flash translation layer which is able to map and/or unmap LBAs to physical storage locations. Accordingly, the flash translation layer may be able to map and/or unmap LBAs to physical storage locations (e.g., blocks) in the memory of the higher performance storage tier. Moreover, the interfaces Interface A and/or Interface B described herein may be implemented on the flash translation layer, e.g., as would be appreciated by one skilled in the art after reading the present description. This may allow certain temperature-based data management applications to dissociate physical location of a LBA from flash when data is moved from flash to a lower performance storage tier. Moreover, should the same LBA be accessed in the future, a flash controller may implement the one or more interfaces Interface A and/or Interface B included herein to map the LBA to the same physical location the LBA was mapped to previously. Being able to recall the initial physical storage location with the help of an interface allows for the logical extent to be mapped to the same physical storage location as long as the physical storage location has not been reused in the meantime.

It should also be noted that although method 600 depicts a number of various processes being performed at certain nodes, this is in no way intended to be limiting. Rather, any one or more of the processes included in method 600 may be performed at different ones of the nodes. For instance, the temperature monitoring of the various logical extents stored in the higher and lower storage tiers may actually be performed by the one or more processors at the higher storage tier and/or the one or more processors at the lower storage tier in other approaches. According to an example, the one or more processors located at node 603 and coupled to the higher storage tier may perform operation 604 and/or decision 606. According to another example, the one or more processors located at node 601 and coupled to the lower storage tier may perform operation 626 and/or decision 628. According to yet another example, the one or more processors located at node 602 may be used to perform any one of processes 638, 640, 642, 644, 646, e.g., in addition to sending one or more instructions to the one or more processors at node 603, as would be appreciated by one skilled in the art after reading the present description.

Similarly, the number of nodes included in FIG. 6 are in no way intended to limit the invention. Depending on the embodiment, a multi-tiered storage system may include any number of storage tier levels, each of which may be represented by a different node. It follows that method 600 may be expanded to apply to embodiments which include more than three nodes.

Furthermore, the order in which various ones of the processes included in method 600 are performed are in no way intended to be limited by the illustration in FIG. 6. For instance, the map command in operation 636 may be received at node 603 prior to the first logical extent received in operation 634. In other approaches, both the first logical extent and the map command may be received simultaneously.

Figure 7:
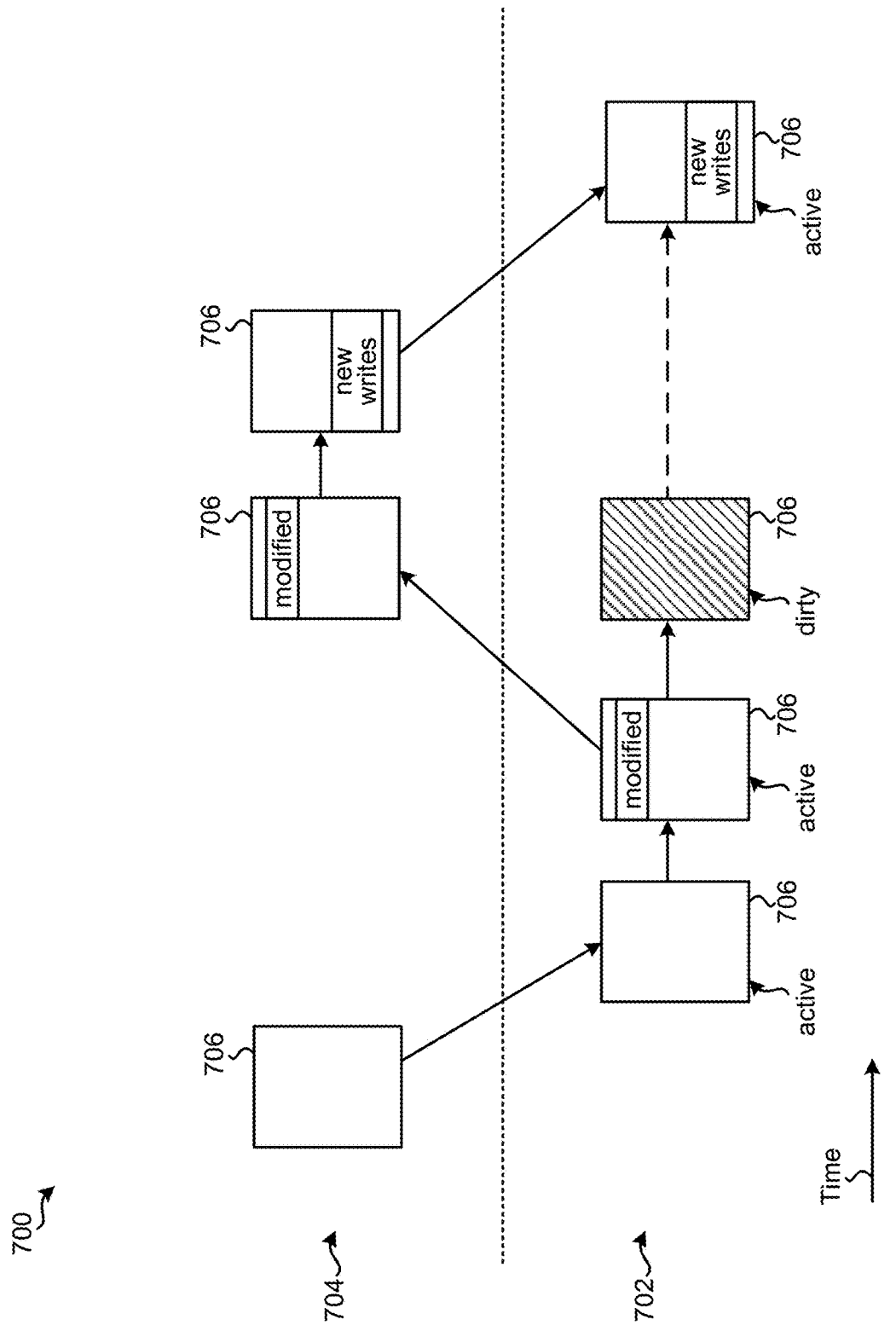
FIG. 7 is a partial representational view of various processes performed on a multi-tiered data storage system over time, in accordance with one in-use embodiment.

Looking to FIG. 7, an in-use example of a flowchart 700 which implements various ones of the processes included in method 600 as time Time progresses. It should be noted that the flowchart 700 of FIG. 7 is in no way intended to limit the invention, and is presented by way of example only.

As shown, flowchart 700 includes a higher storage tier 702 and a lower storage tier 704. According to the in-use example, the higher storage tier 702 includes one or more SSDs, and the lower storage tier 704 includes one or more HDDs. Moreover, a logical extent 706 containing data is stored on the lower storage tier 704 as an only instance. In other words, the data included in the logical extent 706 is only stored on the lower storage tier 704.

It can be deduced from the fact that the logical extent 706 is currently stored on the lower storage tier 704, that a current temperature associated with the logical extent 706 is cold. However, as current temperature associated with the logical extent 706 begins to heat up, it may eventually pass a predetermined threshold, thereby justifying a migration to the higher storage tier 702. When the logical extent 706 is migrated to the higher storage tier 702 for the first time, migration software may be used to allocate a new LBA on the physical blocks of the one or more SSDs in the higher storage tier 702, and the entire logical extent 706 is written to a specific physical storage location the higher storage tier 702 accordingly. Moreover, the specific physical storage location the higher storage tier 702 is marked as being "active", thereby signifying that a logical extent is currently mapped to the physical storage location, and therefore read and/or write operations are currently being performed on the data stored therein.

While the logical extent 706 is stored on the higher storage tier 702, data included therein may be modified, e.g., as a result of write operations received. Accordingly, a portion of the logical extent 706 is identified as being "modified". However, as data in the logical extent 706 begins to be accessed and/or updated less frequently, the current temperature associated with the logical extent 706 becomes cold. As the current temperature drops over time, it may eventually pass the predetermined threshold again, thereby justifying a migration back to the one or more HDDs of the lower storage tier 704. In order to perform this migration, the entire logical extent 706 (including the modified data) is written to the lower storage tier 704. Moreover, the LBA corresponding to the logical extent 706 may be un-mapped from the specific physical storage location the higher storage tier 702. Furthermore a handle corresponding to the specific physical storage location the higher storage tier 702 may be obtained, e.g., using interface A as described above. In some approaches, the handle may be stored by a migration algorithm in the metadata corresponding to the logical extent 706. Accordingly, the handle may be obtained by accessing the metadata corresponding to the logical extent 706, e.g., as would be appreciated by one skilled in the art after reading the present description. Moreover, the specific physical storage location the higher storage tier 702 is preferably marked as being "dirty" as shown.

It should be noted that at this point, the data stored in the specific physical storage location the higher storage tier 702 marked as dirty is an inactive copy of the data included in the logical extent 706. Moreover, the copy of the data included in the logical extent 706 which is stored in the lower storage tier 704 is an active copy. Accordingly, there are at least two copies of the data included in the logical extent 706 currently stored in the higher and lower storage tiers 702, 704.

While the logical extent 706 is stored on the lower storage tier 704, data included therein may be modified further, e.g., as a result of additional write operations received. Accordingly, a portion of the logical extent 706 is identified as including data corresponding to "new writes". However, as data in the logical extent 706 begins to be accessed and/or updated more frequently, the current temperature associated with the logical extent 706 becomes hot again. As the current temperature rises over time, it may eventually pass the predetermined threshold once again, thereby justifying a migration back to the one or more SSDs of the higher storage tier 702. In order to perform this migration, a migration algorithm may be used to initiate movement of the logical extent 706 back to the higher storage tier 702. According to a specific approach, the migration algorithm may use Interface B (e.g., as explained above) to map the logical extent 706 back to the LBA and handle previously identified for the logical extent 706. As mentioned above, information identifying the LBA and handle may be stored in metadata.

However, as described above, this process may only succeed if the specific physical storage location the higher storage tier 702 has not been erased by a garbage collection process. Accordingly, it may first be determined whether the specific physical storage location the higher storage tier 702 is still marked as being dirty. In response to determining that the specific physical storage location the higher storage tier 702 is still marked as being dirty, the migration algorithm may read and compare data currently stored at the specific physical storage location with the data currently included in the logical extent 706 being migrated from the lower storage tier 704. Upon determining the differences between the two copies of the data (i.e., the "new writes"), the modified portions of the data are used to update the data included in the physical storage location the higher storage tier 702.

However, in response to determining that the specific physical storage location the higher storage tier 702 is not still marked as being dirty, the migration algorithm may be used to write all the data included in the logical extent 706 to a new physical storage location in the one or more SSDs of the higher storage tier 702.

It follows that various embodiments described herein are able to provide efficient data management of multi-tier storage architectures by limiting the number of rewrites performed on the same block of data in higher performance storage tiers. As described above, the various approaches included herein consider whether a data extent being migrated to a higher performance storage tier was stored at some physical location of the higher performance storage tier in the recent past. In response to determining that the data extent was stored at some physical location of the higher performance storage tier in the recent past, the same physical location may be reused to store the same data extent, thereby minimizing the amount of data that is written to the higher performance storage tier. Accordingly, by implementing such embodiments as those described herein, various improvements may desirably be achieved. For instance, various ones of the embodiments described herein may improve performance of a multi-tiered data storage system on two fronts. For instance, not only are some of the embodiments included herein able to reduce the amount of write operations performed on higher performance data storage tiers and thereby desirably increase the expected lifetime of the memory itself, but also while maintaining accurate thermal regulation of the data stored in the system and thereby ensuring efficient data management, reduced latency, decreased data access times, reduced CPU utilization, etc.

Various ones of the embodiments described herein may also be implemented in conjunction with (e.g., in parallel with) conventional data heat management procedures without sacrificing effectiveness of the various improvements described and/or suggested herein. In other words, any of the approaches described herein may be implemented when performing an unmap (or similar) operation, while known data temperature management procedures may be otherwise implemented, e.g., in the background.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    receiving an unmap command which corresponds to a first logical extent located in a higher storage tier of a multi-tiered data storage system having the higher storage tier and a lower storage tier, each storage tier comprising a plurality of hardware-based data storage devices;
    unmapping the first logical extent from a first physical storage location in the higher storage tier;
    marking the first physical storage location as dirty;
    storing information which links the first logical extent to the first physical storage location;
    receiving a map command which corresponds to the first logical extent;
    determining whether the first physical storage location is still marked as dirty;
    in response to determining that the first physical storage location is still marked as dirty, determining whether any data included in the first logical extent has been modified since the first logical extent was stored in the higher storage tier; and
    in response to determining that at least some of the data included in the first logical extent has been modified, using the modified data to update corresponding portions of the data stored in the first physical storage location,
    wherein the operations are performed by a flash controller, wherein the flash controller is electrically coupled to the higher storage tier, wherein the flash controller is in communication with a hybrid storage controller,
    wherein the higher storage tier prioritizes reusing physical storage locations in the hardware-based data storage devices of the higher storage tier which are not marked as dirty, over reusing physical storage locations in the hardware-based data storage devices of the higher storage tier which are marked as dirty,
    wherein portions of the data stored in the first physical storage location which correspond to unmodified data included in the first logical extent are not updated.

2. The computer-implemented method as recited in claim 1, comprising:
    in response to determining that the first physical storage location is not still marked as dirty, writing the data included in the first logical extent to a second physical storage location in the higher storage tier, wherein the first and second physical storage locations are different.

3. The computer-implemented method as recited in claim 1, comprising:
    in response to determining that none of the data included in the first logical extent has been modified, maintaining the data stored in the first physical storage location.

4. The computer-implemented method as recited in claim 1, comprising:
    marking the first physical storage location as free in response to a garbage collection operation being performed on the first physical storage location; and
    marking the first physical storage location as active in response to the first physical storage location being used to store data corresponding to a second logical extent, wherein the first and second logical extents are different.

5. The computer-implemented method as recited in claim 4, wherein the higher storage tier includes one or more solid state drives, wherein the lower storage tier includes one or more hard disk drives.

6. The computer-implemented method as recited in claim 1, wherein marking the first physical storage location as dirty includes setting a flag which corresponds to the physical storage location in a lookup table.

7. A computer program product comprising a computer readable storage medium having program instructions embodied therewith, wherein the computer readable storage medium is not a transitory signal per se, the program instructions readable and/or executable by one or more processors to cause the one or more processors to perform a method comprising:
    receiving, by the one or more processors, an unmap command which corresponds to a first logical extent located in a higher storage tier of a multi-tiered data storage system having the higher storage tier and a lower storage tier, each storage tier comprising a plurality of hardware-based data storage devices;
unmapping, by the one or more processors, the first logical extent from a first physical storage location in the higher storage tier;
marking, by the one or more processors, the first physical storage location as dirty;
storing, by the one or more processors, information which links the first logical extent to the first physical storage location;
receiving, by the one or more processors, a map command which corresponds to the first logical extent;
using, by the one or more processor, the stored information to map the first logical extent to the first physical storage location;
in response to mapping the first logical extent to the first physical storage location, determining, by the one or more processors, whether the first physical storage location is still marked as dirty;
in response to determining that the first physical storage location is still marked as dirty, determining, by the one or more processors, whether any data included in the first logical extent has been modified since the first logical extent was stored in the higher storage tier; and
in response to determining that at least some of the data included in the first logical extent has been modified, using, by the one or more processors, the modified data to update corresponding portions of the data stored in the first physical storage location,
wherein the higher storage tier prioritizes reusing physical storage locations in the hardware-based data storage devices of the higher storage tier which are not marked as dirty, over reusing physical storage locations in the hardware-based data storage devices of the higher storage tier which are marked as dirty,
wherein portions of the data stored in the first physical storage location which correspond to unmodified data included in the first logical extent are not updated.

8. The computer program product as recited in claim 7, the program instructions readable and/or executable by the one or more processors to cause the one or more processors to perform the method comprising:
in response to determining that the first physical storage location is not still marked as dirty, writing, by the one or more processors, the data included in the first logical extent to a second physical storage location in the higher storage tier, wherein the first and second physical storage locations are different.

9. The computer program product as recited in claim 7, the program instructions readable and/or executable by the one or more processors to cause the one or more processors to perform the method comprising:
in response to determining that none of the data included in the first logical extent has been modified, maintaining, by the one or more processors, the data stored in the first physical storage location.

10. The computer program product as recited in claim 7, the program instructions readable and/or executable by the one or more processors to cause the one or more processors to perform the method comprising:
marking, by the one or more processors, the first physical storage location as free in response to a garbage collection operation being performed on the first physical storage location; and
marking, by the one or more processors, the first physical storage location as active in response to the first physical storage location being used to store data corresponding to a second logical extent, wherein the first and second logical extents are different.

11. The computer program product as recited in claim 7, wherein the higher storage tier includes one or more solid state drives, wherein the lower storage tier includes one or more hard disk drives.

12. The computer program product as recited in claim 7, wherein the method is performed by a flash controller, wherein the flash controller is electrically coupled to the higher storage tier, wherein the flash controller is in communication with a hybrid storage controller.

13. The computer program product as recited in claim 7, wherein marking the first physical storage location as dirty includes setting a flag which corresponds to the physical storage location in a lookup table.

14. A computer-implemented method, comprising:
monitoring a current temperature corresponding to a first logical extent located in a higher storage tier of a multi-tiered data storage system having the higher storage tier and a lower storage tier, each storage tier comprising a plurality of hardware-based data storage devices;
determining whether the current temperature is outside a predetermined range;
sending one or more instructions to unmap the first logical extent in response to determining that the current temperature is outside the predetermined range;
receiving an indication that the first logical extent has been unmapped from a first physical storage location in the higher storage tier;
sending one or more instructions to mark the first physical storage location as dirty;
sending one or more instructions to store information which links the first logical extent to the first physical storage location;
receiving data corresponding to the first logical extent from the higher storage tier;
sending the data corresponding to the first logical extent to the lower storage tier;
monitoring the current temperature corresponding to the first logical extent located in the lower storage tier;
determining whether the current temperature is outside the predetermined range;
sending a request for the data corresponding to the first logical extent in response to determining that the current temperature is not outside the predetermined range;
receiving the data corresponding to the first logical extent from the lower storage tier;
sending the data corresponding to the first logical extent to the higher storage tier;
mapping the first logical extent to the first physical storage location;
in response to mapping the first logical extent to the first physical storage location, determining whether the first physical storage location is still marked as dirty;
in response to determining that the first physical storage location is still marked as dirty, determining whether any of the data included in the first logical extent has been modified since the first logical extent was stored in the higher storage tier; and
in response to determining that at least some of the data included in the first logical extent has been modified, sending one or more instructions to use the modified data to update corresponding portions of the data stored in the first physical storage location in the higher storage tier, wherein the higher storage tier prioritizes reusing physical storage locations in the hardware-based data storage devices of the higher storage tier which are not marked as dirty, over reusing physical storage locations in the hardware-based data storage devices of the higher storage tier which are marked as dirty, wherein portions of the data stored in the first physical storage location which correspond to unmodified data included in the first logical extent are not updated.

15. The computer-implemented method as recited in claim 14, comprising:

in response to determining that the first physical storage location is not still marked as dirty, sending one or more instructions to write the data included in the first logical extent to a second physical storage location in the higher storage tier, wherein the first and second physical storage locations are different.

16. The computer-implemented method as recited in claim 14, comprising:

in response to determining that none of the data included in the first logical extent has been modified, sending one or more instructions to maintain the data stored in the first physical storage location.

17. The computer-implemented method as recited in claim 14, wherein the higher storage tier includes one or more solid state drives, wherein the lower storage tier includes one or more hard disk drives.

18. The computer-implemented method as recited in claim 14, wherein the operations are performed by a hybrid storage controller, wherein the hybrid storage controller is in communication with the higher storage tier and in communication with the lower storage tier.

19. The computer-implemented method as recited in claim 14, wherein marking the first physical storage location as dirty includes amending a unique identifier corresponding to the physical storage location.

\* \* \* \* \*